United States Patent
Honda et al.

(10) Patent No.: US 7,559,189 B2
(45) Date of Patent: Jul. 14, 2009

(54) SOUNDPROOF GEARED CABLE

(75) Inventors: Takahiro Honda, Hyogo (JP); Takashi Yanagita, Hyogo (JP)

(73) Assignee: Hi-Lex Corporation, Hyogo (JP)

( * ) Notice: Subject to any disclaimer, the term of this patent is extended or adjusted under 35 U.S.C. 154(b) by 184 days.

(21) Appl. No.: 11/604,398

(22) Filed: Nov. 27, 2006

(65) Prior Publication Data

US 2007/0209467 A1    Sep. 13, 2007

Related U.S. Application Data

(63) Continuation-in-part of application No. PCT/JP2005/009626, filed on May 26, 2005.

(30) Foreign Application Priority Data

May 26, 2004   (JP)   ............................. 2004-155537

(51) Int. Cl.
*D07B 1/00* (2006.01)
(52) U.S. Cl. .......................................... 57/223; 57/232
(58) Field of Classification Search .................... 57/223, 57/232; 74/502.4, 502.5
See application file for complete search history.

(56) References Cited

U.S. PATENT DOCUMENTS 5,239,890 A    8/1993   Sosnoski et al.
6,588,193 B2 *  7/2003   Hayes ........................... 57/223

FOREIGN PATENT DOCUMENTS

| JP | 56 105109 A | 8/1981 |
|----|-------------|--------|
| JP | 6 307519 A | 11/1994 |
| JP | 10-159832 A | 6/1998 |
| JP | 2000-274422 A | 10/2000 |
| JP | 2002-147430 A | 5/2002 |

* cited by examiner

*Primary Examiner*—Shaun R Hurley
(74) *Attorney, Agent, or Firm*—Browdy and Neimark, P.L.L.C.

(57) ABSTRACT

To provide a noiseproof toothed cable enabling a reduction in noise generated by the contact thereof with a conduit, a reduction in use load, and manufacturable easily. This noiseproof toothed cable (10) comprises a toothed cable (13) having a core (11) formed of metal wires and a tooth line (12) formed on the outer peripheral surface of the core (11) and a tube-like resin coat (14) installed on the outer periphery of the toothed cable (13). Spaces (20) are provided between the recessed parts (18) of the resin coat and the core (11), the projected parts (19) of the resin coat is brought into contact with the tooth line (12), and the recessed amount of the recessed parts (18) of the resin coat positioned between the parts of the tooth line (12) is set to 0.1 to 0.5 mm.

10 Claims, 5 Drawing Sheets

[Endurance Test Conditions]
Power supply voltage: Motor terminal voltage 13.5 V
Stroke: Full stroke
Temperature: 90 °C × 4 H → Normal temperature

SOUNDPROOF GEARED CABLE

FIELD OF THE INVENTION

This invention relates to a sound proof geared cable.

BACKGROUND ARTS

[Patent Document 1] Published Japanese Patent Application No. S56-105109
[Patent Document 2] Examined Japanese Utility Model application publication No. S58-29324
[Patent Document 3] Published Japanese Utility Model application No. S55-170519
[Patent Document 4] Examined Japanese Utility Model application publication No. S58-13169
[Patent Document 5] Examined Japanese Utility Model application publication No. S58-13171

A geared cables in which gear teeth are formed around the coil have been used for automobile window regulators and automobile sunroof closing mechanisms. However, since these geared cables generate noises while sliding in guide pipes, soundproof geared cables having high durability with low generated noises in use are sought, and various cables have been developed.

In the Patent Document 1, a soundproof geared cable of which the periphery is covered with synthetic resin, formed by extrusion, is disclosed. In this cable, the synthetic resin is pressed against the geared cable by vacuuming partially the space between the synthetic resin coating and the geared cable in the extrusion.

In the Patent Document 2, a soundproof geared cable, in which the soft synthetic resin or soft rubber core, and the gear teeth composed of a metal wire wound around the core, is disclosed, so that the core is projected outward from the outside of the gear teeth.

In the Patent Document 3, a soundproof geared cable, in which the periphery of the geared cable covered with an elastic tube composed of soft synthetic resin or soft rubber properly tightening the cable, is disclosed. Further in this the Patent Document 3, it described that the elastic tube can be fixed to the gear teeth of the geared cable by adhesion or welding.

In the Patent Document 4, a soundproof geared cable, in which an elastic member is wound between the gear teeth of the geared cable, so that the elastic member is projected outward from the outside of the gear teeth, is disclosed.

In the Patent Document 5, a soundproof geared cable, in which a fabric member is wound between the gear teeth of the geared cable, so that the fabric member is projected outward from the outside of the gear teeth.

DISCLOSURE OF INVENTION

In order to satisfy a user's further requirements, this invention is directed to providing a soundproof gear cable with low noises generated against the guide pipe compared with conventional geared cables, small load in use, and is easy to manufacture.

The soundproof geared cable of this invention comprises a geared cable having a core composed of a plurality of metal wires and a gear teeth fabricated by winding a metal wire spirally with equal intervals around a periphery of the core; and a tubular resin coat, provided by an extrusion, having a concave part and a convex part around the periphery of the geared cable, wherein a space is provided between the concave part of the resin coat and the core, the convex part of the resin coat and the gear teeth is contacted, and a depth of the concave part positioned between the gear teeth is 0.1 to 0.5 mm.

In such soundproof geared cable, it is preferable that the flexural modulus of the resin coat based on ASTM D790 is to be 150 to 1300 MPa.

The second aspect of the soundproof geared cable of this invention comprises a geared cable having a core composed of a plurality of metal wires, a gear teeth fabricated by winding a metal wire spirally with equal intervals around a periphery of the core, and a protection coat formed around the gear teeth; and a tubular resin coat, provided by an extrusion, having a concave part and convex part around a periphery of the geared cable, wherein a space is provided between the concave part of the resin coat and the core, and the convex part of the resin coat and the protection coat is contacted.

The soundproof geared cable in any of the above, it is preferable that a silicon layer is provided around the periphery of the resin coat.

The manufacturing method of the soundproof geared cable of this invention, comprises the steps of forming a geared cable having a core composed of a plurality of metal wires and a gear teeth fabricated by winding a metal wire spirally with equal intervals around a periphery of the core, preheating the geared cable, providing a tubular resin coat having a concave part and convex part around a periphery of the geared cable by extrusion without vacuuming. Further, it is preferable that the depth of the concave part of the resin coat positioned between the gear teeth is formed to be 0.1 to 0.5 mm.

The second aspect of the manufacturing method of the soundproof geared cable, comprises a steps of forming a geared cable having a core composed of a plurality of metal wires and a gear teeth fabricated by winding a metal wire spirally with equal intervals around a periphery of the core, preheating the geared cable, providing a protection coat having a concave part and convex part around a periphery of the geared cable by extrusion without vacuuming, providing a resin coat having a concave part and convex part around a periphery of the protection coat by extrusion without vacuuming. The method described in any of the above may comprises the process of coating silicon around a periphery of the resin coat.

Since the soundproof geared cable of this invention has the resin coat of which the depth of the concave part positioned between the gear teeth is 0.1 to 0.5 mm, close contact with the gear teeth of the geared cable is achieved. By this construction, the friction against the metal pipes, and guide pipes etc. is less, resulting in less noise. And because the resin coat is formed by extrusion, the depth and the elasticity modulus of the concave part may be formed evenly. Further, because the forming is easy, the production cost of the soundproof geared cable can be held down. Furthermore, since it is so formed that the convex part and the gear teeth contact, and that a space is left between the concave part and the core of the geared cable, it can securely meshed with an engaging fixture such as a pinion, enabling efficient transmission of the motive energy to the soundproof geared cable.

In the case that the soundproof geared cable of which the flexural modulus of the resin coat based on ASTM D790 is 150 to 1300 MPa, the obtained geared cable has flexibility and excellent sound insulating properties, and further has a resin coat with excellent durability.

In the second aspect of the soundproof geared cable of this invention, since the geared cable is provided with the protection coat, a close relationship between the geared cable and the resin coat is obtained. Further, since the metal wire is covered with the protection coat and the resin coat, durability as a soundproof geared cable is high.

In the case that a silicon layer is provided around the periphery of the resin coat in any of the above soundproof geared cable, friction against the metal pipes, the guide pipe is further reduced, enabling further reduction of noise.

In the manufacturing method of the soundproof geared cable of this invention, since the geared cable is preheated after the forming of the geared cable, close contact to the later formed resin coat having unevenness is obtained. Further, since the resin coat having unevenness is formed by extrusion without vacuuming, it is possible to make the resin coat having a radial thickness and furthermore to form the resin coat having elasticity and flexibility. Because of this, meshing with the engaging fixture, such as a pinion, is secured.

The above described preheating of the cable can be carried out by passing the cable through an electric furnace or a high frequency induction heating furnace, but the optimum condition of the temperature varies depending on the material of the resin coat used and the temperature of the cooling carried out after the forming of the resin coat. When the depth of the concave part of the resin coat is formed to be 0.1 to 0.5 mm, the close contact of the geared cable of the resin coat is obtained and it can be easily formed into a tubular shape. When the depth of the concave part is smaller than 0.1 mm due to insufficient preheating, enough close contact cannot be obtained. When the depth of the concave part is larger than 0.5 mm due to the high preheating temperature, sliding noises against metal pipes and guide pipes etc. become large.

The second aspect of the manufacturing method of the soundproof geared cable of this invention comprises the process of forming a geared cable having a core composed of a plurality of metal wires and a gear teeth fabricated by winding a metal wire spirally with equal intervals around a periphery of the core, preheating the geared cable, providing a protection coat having a concave part and convex part around a periphery of the geared cable by extrusion without vacuuming, and providing a resin coat having a concave part and convex part around a periphery of the protection coat by extrusion without vacuuming. By this method, inner cables with low sliding noises generated against the guide pipes and with excellent durability can be easily manufactured.

BRIEF DESCRIPTION OF DRAWINGS

FIG. 1a is a side cross section showing an embodiment of the soundproof geared cable of this invention, FIG. 1b is a X-X line cross section of FIG. 1a.

FIG. 2a is a side cross section showing the other embodiment of the soundproof geared cable of this invention, FIG. 2b is a X-X line cross section of FIG. 2a.

FIG. 3a is a side cross section showing another embodiment of the soundproof geared cable of this invention, FIG. 3b is a X-X line cross section of FIG. 3a.

BEST MODE FOR CARRYING OUT THE INVENTION

The embodiment of this invention is described using drawings.

Figure 1:
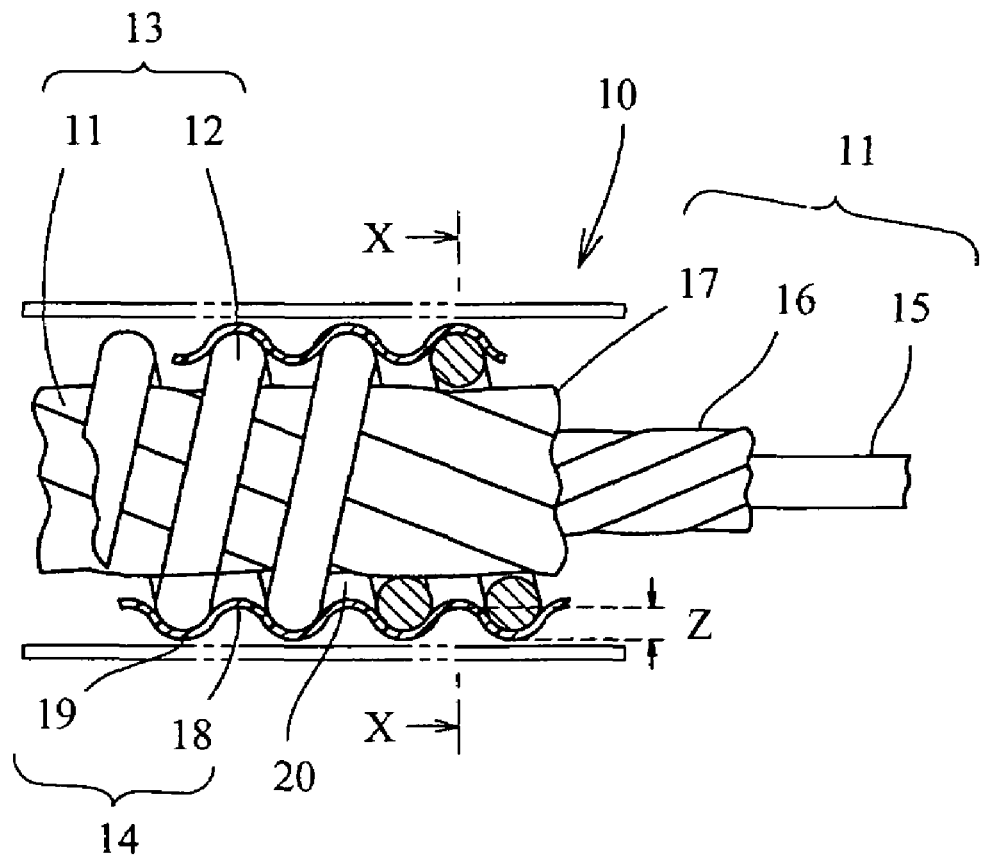
Figure 1:
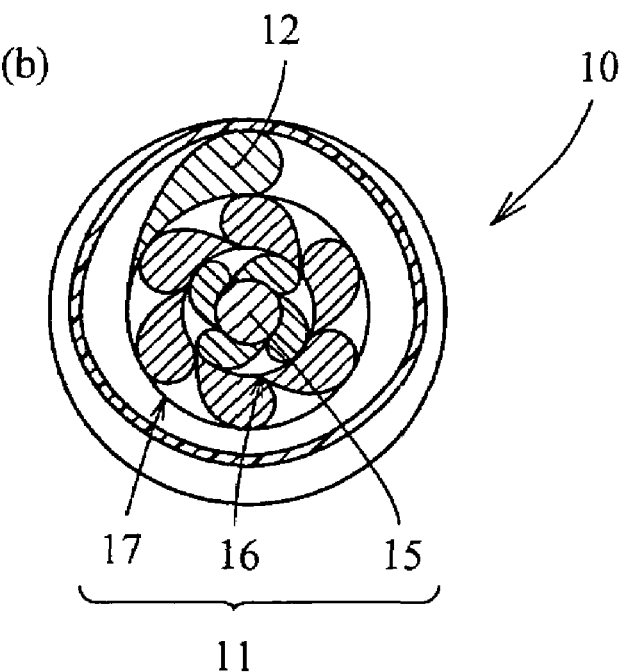

The soundproof geared cable 10 in FIG. 1 comprises a geared cable 13 having a core 11 composed of metal wires and gear teeth 12 provided around the periphery of the core and a tubular resin coat 14 provided around the geared cable 13.

The core 11 comprises a core wire 15 composed of a metal wire, a first wire-wound layer 16 formed by winding four metal wires around the core wire, and a second wire-wound layer 17 formed by winding inversely six metal wires around the first wire-wound layer. The outer diameter of the core is formed so as to be 2.5 to 2.7 mm.

Gear teeth 12 are formed by wounding a metal wire spirally around the core with 2.4 to 2.6 mm gaps between the windings. Thereby, the geared cable with the outer diameter of 4.5 to 4.8 mm is formed.

The resin coat 14 is a tube having a concave part and a convex part along the gear teeth 12 with its radial thickness to be 0.1 to 0.3 mm and its depth of the concave part 18 to be 0.1 to 0.5 mm (see reference alphabet Z in FIG. 1(a)). The convex part 19 of the resin coat 14 contacts the gear teeth 12, and a space 20 is provided between the concave part 18 of the resin coat 14 and the core 11. As the material for such resin coat 14, synthetic resin with low friction coefficient having flexibility or elasticity such as nylon resin, polyester resin, polyurethane resin, polyolefin resin and so on can be used, and an elastomer of polyester is preferable among them. For nylon resin etc., an elasticizer may be blended to enhance the flexibility.

Such soundproof geared cable 10 is manufactured as described below. After twisting the geared cable 13 together, the geared cable 13 is preheated up to 50-150° C. Then, the synthetic resin material is formed into a tubular shape around the periphery of the geared cable 13 by extrusion (tubing) without vacuuming.

At this moment, the close contact relation between the geared cable (the gear teeth 12) and the resin coat 14 is enhanced by preheating the geared cable 13 before the extrusion. In the case of insufficient preheating (low temperature), the close contact relation between the geared cable and the resin coat cannot be secured enough, and in the case of insufficient preheating (high temperature), tubing by extrusion does not meet with success. These temperatures are not particularly limited, and can be determined appropriately depending on the material of the resin.

In addition, by not performing vacuuming during the extrusion, the radial thickness of the resin coat 14 can be secured and the space 20 between the core of the geared cable and the resin coat can be provided. Further, the resin coat 14 having flexibility and elasticity can be formed.

The soundproof geared cable manufactured as above is used as follows. The teeth of a pinion or rack mounted on a motor etc. and the gear teeth of the soundproof geared cable engage, and the soundproof geared cable moves in the axial direction depending on the rotation of the pinion. When the soundproof geared cable is used for window regulators or sunroof closing mechanisms, it is used by being inserted into guide pipes.

In the soundproof geared cable 10, forming the resin coat 14 having flexibility and elasticity so as to provide the space 20 between the geared cable 13 and the resin coat 14 makes the pinion teeth and the concave part 18 and convex part 19 (or gear teeth 12) of the soundproof cable 10 engage securely. Further, since the close contact relationship between the geared cable 13 and the resin coat 14 is solid at the convex part 19 of the resin coat, there is only a low possibility that the resin coat 14 will drop out, deviate from the geared cable 13 or collapse, thus presenting high durability. Furthermore, provision of the resin coat 14 makes the friction against the guide pipe small, sliding resistance small, and noise level low.

In other words, it enables the motive energy to be converted to the sound proof geared cable 10 efficiently.

Figure 2:
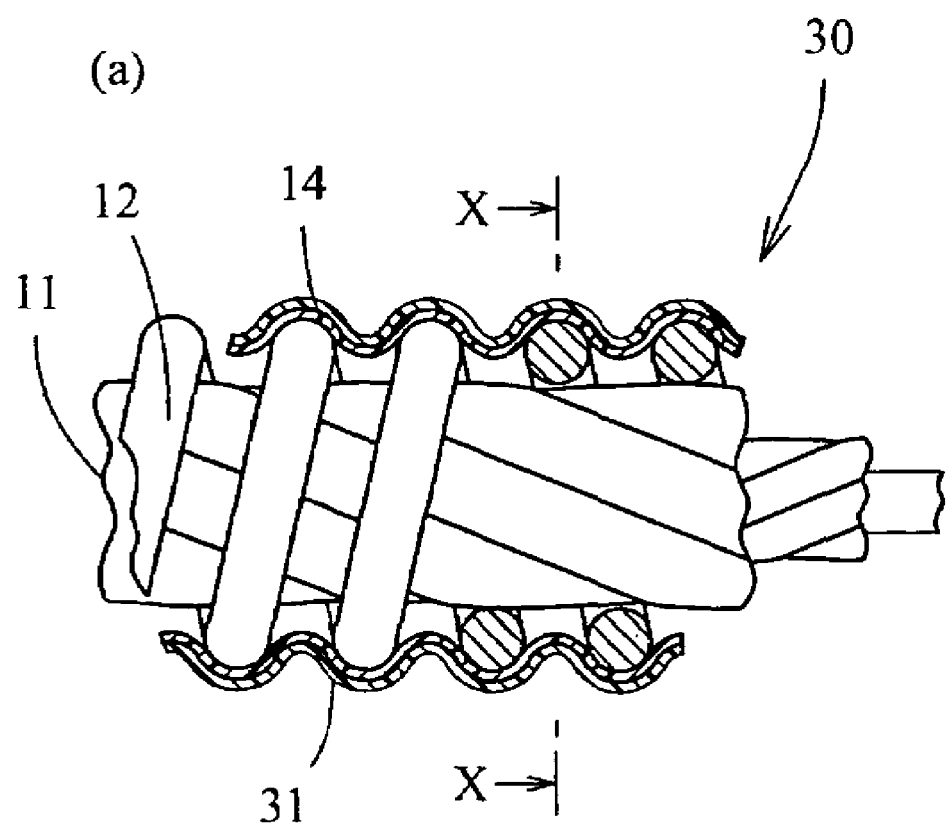
Figure 2:
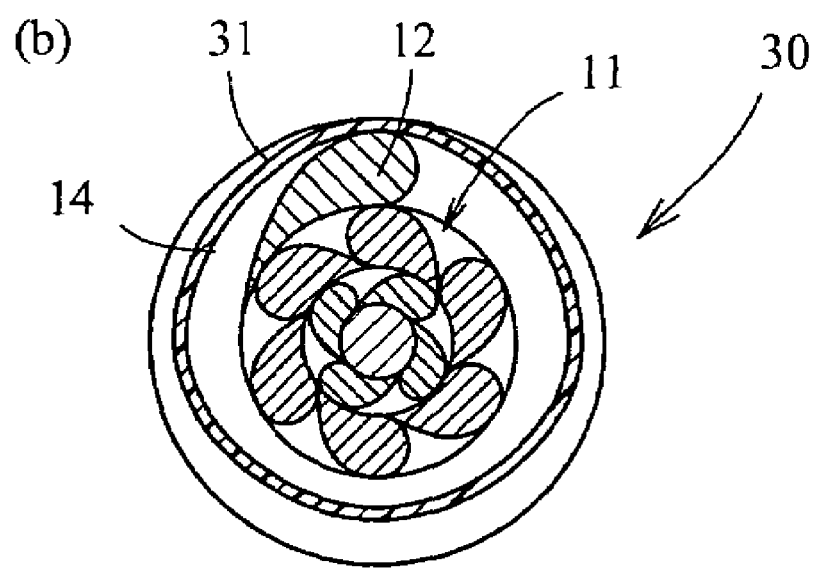

The soundproof geared cable 30 shown in FIG. 2 is the one in which a silicon layer 31 is provided around the periphery of the soundproof geared cable 10 of FIG. 1. Thereby, the friction between the periphery of the soundproof geared cable 30 and the metal guide pipe is further decreased, lowering further the noise accompanying the operation of the soundproof cable.

Such silicon layer 31 can be obtained by coating and drying silicon emulsion on the periphery of the soundproof geared cable 10. As the silicon emulsion, low polymerization grade silicon emulsion and amino-modified silicon emulsion can be cited.

Figure 3:
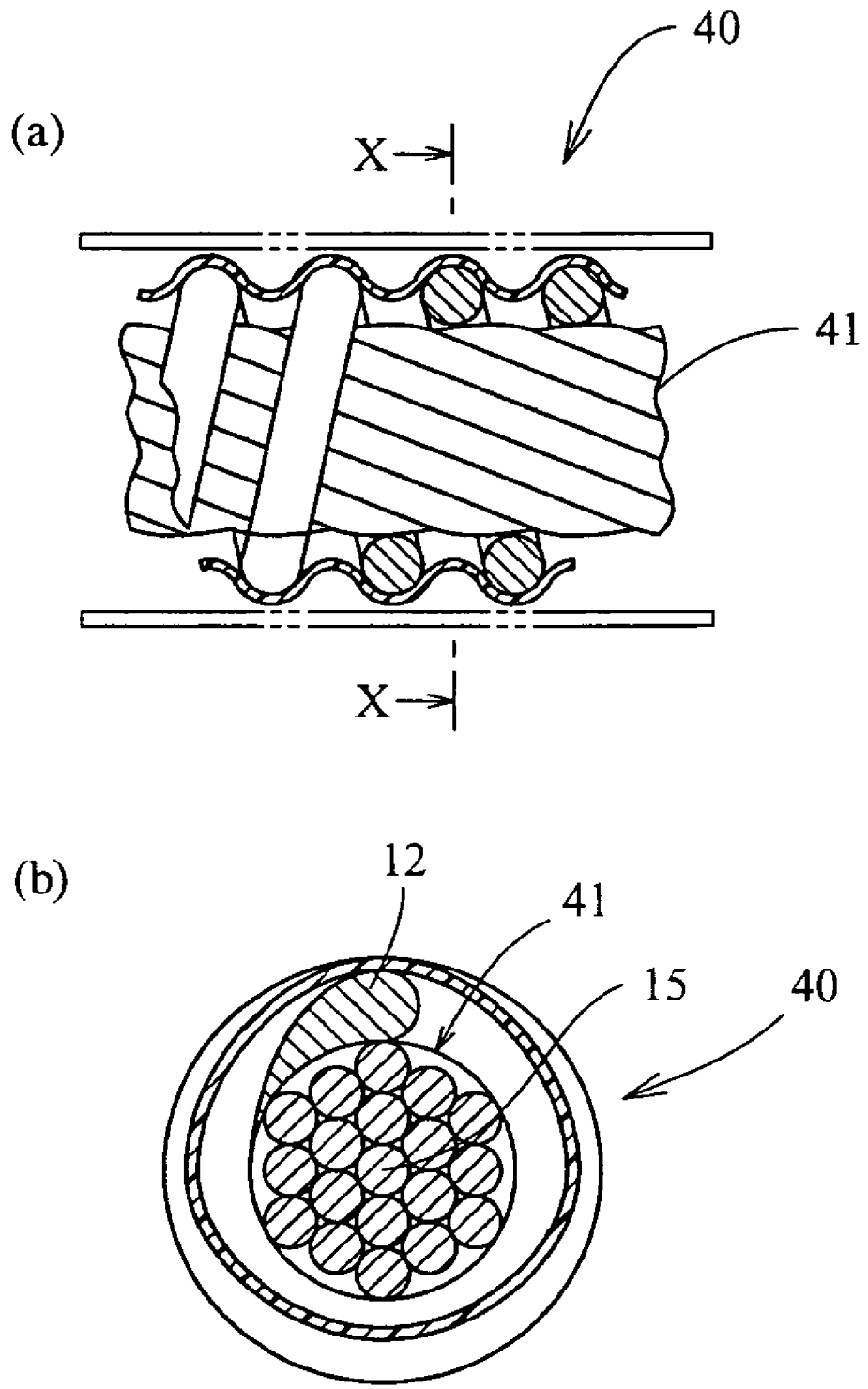

The soundproof geared cable 40 shown in FIG. 3 has the Warrington type W(19) structure formed so that 12 metal wires are further twisted in parallel around the core 41, which is a core strand having a 1×7 structure composed of 7 metal wires. The other composition is same as that of FIG. 1, wherein the gear teeth 12 are wound around this core and the resin coat 14 is formed. The use of this core 41 provides a soundproof geared cable having higher strength.

In the embodiments, two kinds of the composition are disclosed, but the structures in this invention are not limited to these, and they may be twisted wires composed of metal wires.

Figure 4:
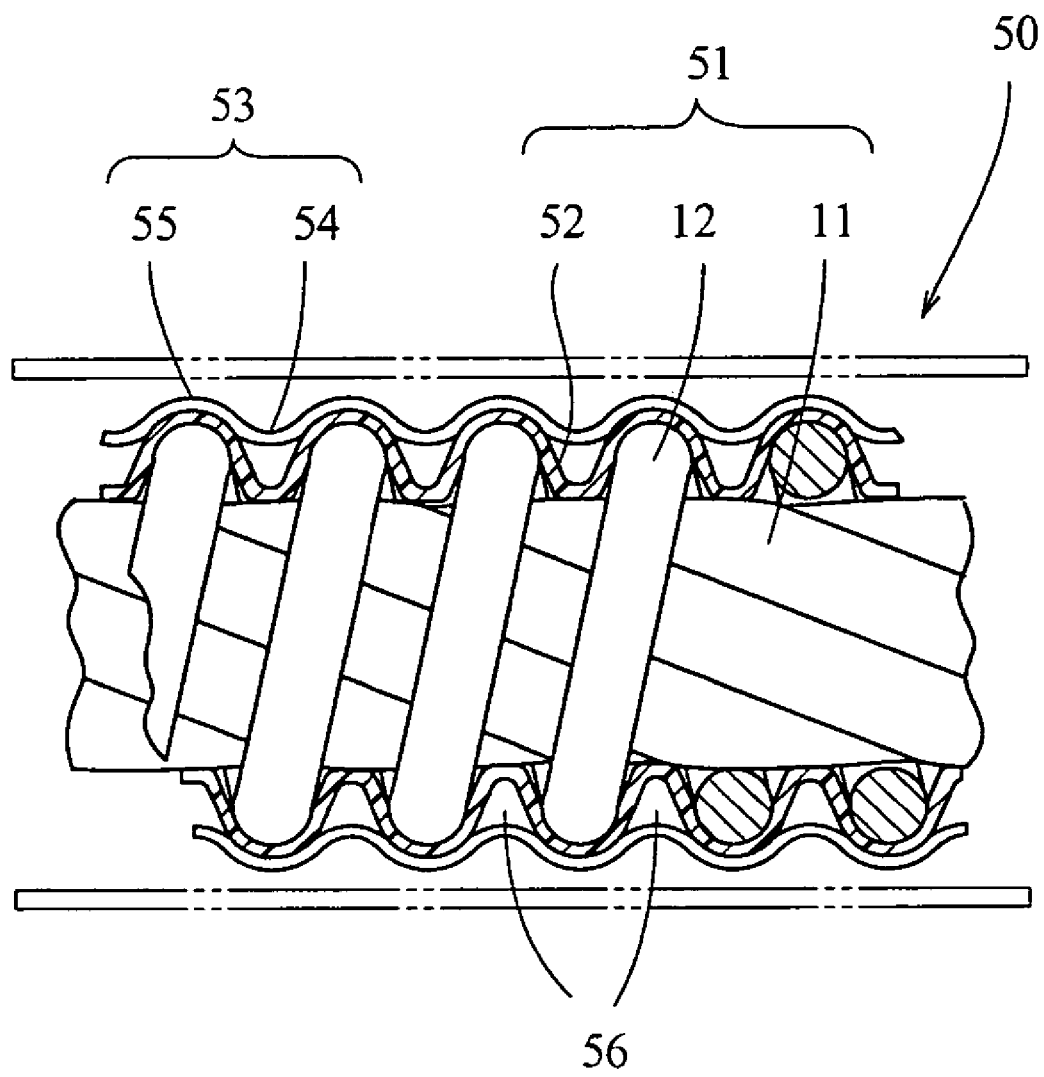
FIG. 4 is a side cross section showing another embodiment of the soundproof geared cable of this invention.

In the soundproof geared cable 50 shown in FIG. 4, the geared cable 51 is provided with the protection coat 52, wherein the resin coat 53 is formed around the periphery of the geared cable 51. The other composition is substantially same as that of the soundproof geared cable 10 of FIG. 1.

The protection coat 52 is in close contact with the geared cable 51. The protection coat 52 and the resin coat 53 are welded at the convex part 55 of the resin coat and separated at the concave part 54. The depth of the concave part is 0.1 to 0.5 mm. Thereby, the space 56 is formed between the protection coat 52 and the resin coat 53. The material of such protection coat is not particularly limited, and employing the same material as the resin coat 53 can enhance the close contact by welding between the protection coat 52 and the resin coat 53.

Such soundproof geared cable 50 can be manufactured as described bellow. As the soundproof geared cable shown in FIG. 1, a geared cable is formed by twisting metal wires together. The geared cable is preheated, and the protection coat 52 is formed by extrusion while vacuuming. Thereby, the geared cable 51 having the closely contacted protection coat 52 is obtained. After that, the geared cable 51 having the protection coat is preheated up to near the melting point of the material of the protection coat, and the extrusion of the resin coat without vacuuming is carried out to obtain the soundproof geared cable 50. In this soundproof geared cable obtained by this method, the protection coat 52 and the resin coat 53 are separated to form the space 56 at the concave part between the gear teeth. And the protection coat 52 and the resin coat 53 is welded, at the convex part 55 of the gear teeth 50.

In the soundproof cable 50, the resin coat and the protection coat is welded at the gear teeth portion, but it may only be closely contacted. In this case, by selecting the material of the protection coat and the resin coat respectively so as to increase the frictional force, the close contact of the protection coat and the resin coat can be enhanced. The above-described soundproof cables are used for window regulators, sunroof closing mechanisms or the closing mechanisms of ceiling windows, sunshades of the side windows.

EMBODIMENTS

Embodiment 1

Referencing FIG. 1, a core 11 was so formed as to be 2.6 mm in its outer diameter. The core 11 comprises the core wire 15 composed of a metal steel wire of outer diameter 0.73 mm, a first wire-wound layer 16 formed by winding spirally the four metal steel wires whose outer diameter was 0.36 mm, and a second wire-wound layer 17 formed by winding spirally in the reverse direction six metal steel wires whose outer diameter was 0.6 mm. Then, the gear teeth 12 were formed by winding spirally a metal steel wire whose outer diameter was 1.2 mm with 2.54 mm gaps, and the geared cable was so formed as to be 4.65 mm in its outer diameter. With this geared cable being preheated, the resin coat 12 of PA 12 elastomer synthetic resin whose flexural modulus was 340 MPa based on ASTM D790 was formed on the periphery by extrusion so as to be 0.1 mm in its depth of the concave part 18. The soundproof geared cable of the embodiment 1 whose diameter was 5.0 mm was obtained.

Embodiment 2

The geared cable obtained in the embodiment 1 was preheated. Then resin coat 14 of nylon 11 containing a plasticizer synthetic whose flexural modulus was 880 MPa, was formed around the periphery by extrusion so as to be 0.2 mm in its depth of the concave part 18. Then the silicon emulsion was applied as a protection coat 31 to obtain the soundproof geared cable of the embodiment 2 whose diameter was 5.0 mm.

Embodiment 3

The soundproof geared cable of the embodiment 3 whose diameter was 5.0 mm was obtained by the same method as the embodiment 1 except that the synthetic resin coat 14 was changed to TPEE whose flexural modulus was 494 MPa and the depth of the concave part 18 was made to be 0.2 mm.

Embodiment 4

The soundproof geared cable of the embodiment 4 whose diameter was 5.0 mm was obtained by the same method as the embodiment 1 except that the synthetic resin coat 14 was changed to olefin elastomer whose flexural modulus was 60 Mpa and the depth of the concave part 18 was made to be 0.2 mm.

Comparative Example 1

The soundproof geared cable was formed by the method same as the embodiment 1, and an adhesive agent was coated by dipping and hairs were grafted by electrostatic hair grafting to obtain the soundproof geared cable of the comparative example 1.

Comparative Example 2

The soundproof geared cable was formed by the same method as the embodiment 1, a nylon tube of the outer diameter 1.35 mm, inner diameter 1.05 mm composed of PA 12 whose flexural modulus was 1200 MPa was wound between the gear teeth to obtain the soundproof geared cable of the comparative example 2.

Comparative Example 3

The soundproof geared cable of the comparative example 3 was obtained by the method same as the embodiment 3 except that the preheating temperature applied to the geared cable was increased and that the depth of the concave part of the resin coat was increased to be 0.55 mm.

Figure 5:
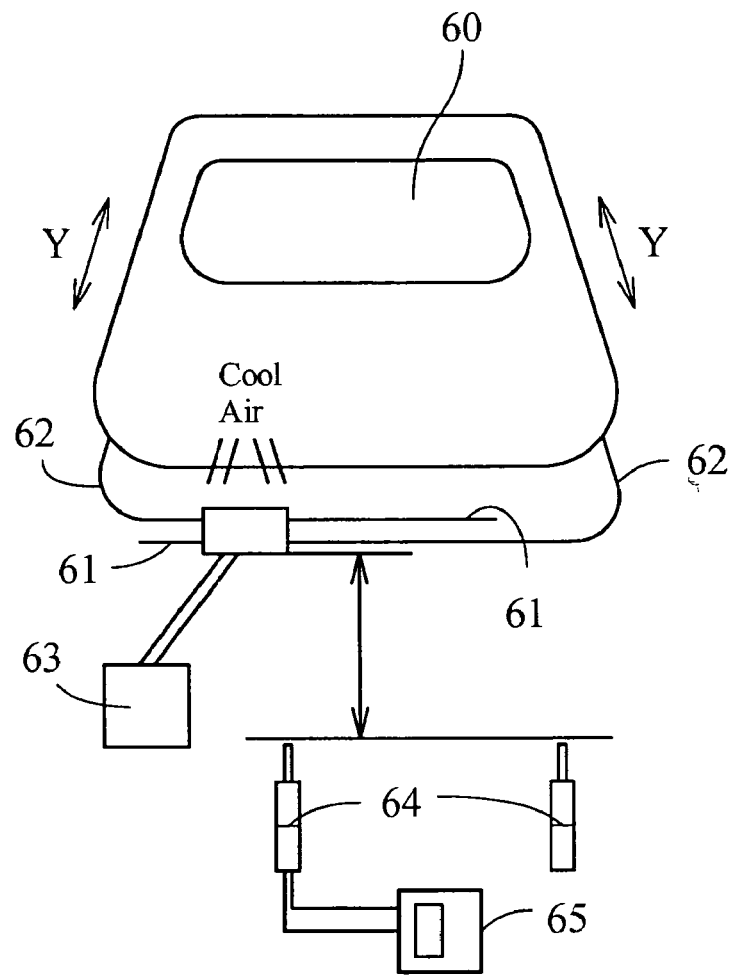
FIG. 5 is an outline drawing showing the method of noise measurement of the soundproof geared cable of this invention.

The soundproof geared cables obtained in the embodiment 1, 2, 3, 4 and the comparative example 1, 2, 3 were installed as shown in FIG. 5. The one end of the soundproof geared cable 61 is fixed to a roof lid 60. Then, another end was engaged with the pinion (not shown in the figure) of a motor 63. Between the roof lid 60 and the motor 63, the soundproof geared cable is supported by a pipe (guide pipe) 62. The inner diameter of the pipe 62 is 5.3 mm. This soundproof geared cable 61 is moved right and left using the motor 63. Thereby, the roof lid 60 moves along the arrow head Y. A noise level meter 64 was placed at the position 300 mm just under the motor and 300 mm just under the L side corner, and the noise and the operating current accompanying the movement of the sunroof lid 60 were measured. Further, in this status, under the condition shown below, an endurance test was performed. The motor 63 is always cooled by air cooling. Additionally, the reference numeral 65 is a data recorder. The results are shown in Table 1.

TABLE 1

| | Depth of Concave Part | Flexural Modulus | Operating Noise | Operating Current | Results Durability |
|---|---|---|---|---|---|
| Embodiment 1 | 0.1 mm | 340 MPa | 54 db | 3.0 A | ○ |
| Embodiment 2 | 0.2 mm | 880 MPa | 58 db | 2.0 A | ○ |
| Embodiment 3 | 0.2 mm | 494 MPa | 59 db | 2.0 A | ○ |
| Embodiment 4 | 0.2 mm | 60 MPa | 60 db | 3.0 A | X |
| Comparative Example 1 | — | — | 61 db | 2.5 A | ○ |
| Comparative Example 2 | — | 120 MPa | 63 db | 3.5 A | Δ |
| Comparative Example 3 | 0.55 mm | 494 MPa | 61 db | 3.0 A | ○ |

○: Operating with nothing peculiar
Δ: Operating with heavy performance degradation
X: Operation stopped due to peeling of the coat As shown in Table 1, the embodiment 1 to 4 could suppress the operating current less than 3.0 A and the operating noises lower than 60 db.

The invention claimed is:

1. A soundproof geared cable, comprising
a geared cable having a core composed of a plurality of metal wires and a gear teeth fabricated by winding a metal wire spirally with equal intervals around a periphery of the core; and
a tubular resin coat, provided by an extrusion, having a concave part and a convex part around the periphery of the geared cable,
wherein a space is provided between the concave part of the resin coat and the core so that the concave part of the resin coat and the core are not in contact with one another, the convex part of the resin coat and the gear teeth are in contact with one another, and a depth of the concave part positioned between the gear teeth is 0.1 to 0.5 mm.

2. A sound proof geared cable according to claim 1, wherein a flexural modulus of the resin coat based on ASTM D790 is 150 to 1300 MPa.

3. A sound proof geared cable, comprising
a geared cable having a core composed of a plurality of metal wires, a gear teeth fabricated by winding a metal wire spirally with equal intervals around a periphery of the core, and a protection coat formed around the gear teeth; and
a tubular resin coat, provided by an extrusion, having a concave part and convex part around a periphery of the geared cable,
wherein a space is provided between the concave part of the resin coat and the protection coat so that the concave part of the protection coat and the resin coat are not in contact with one another, and the convex part of the protection coat and the core are in contact with one another.

4. A sound proof geared cable according to claim 1, wherein a silicon layer is provided around periphery of the resin coat.

5. A method for manufacturing the soundproof geared cable of claim 1, comprising:
forming a geared cable having a core composed of a plurality of metal wires and a gear teeth fabricated by winding a metal wire spirally with equal intervals around a periphery of the core,
preheating the geared cable,
providing a tubular resin coat having a concave part and convex part around a periphery of the geared cable by extrusion without vacuuming.

6. A method for manufacturing the sound proof geared cable of claim 3, comprising:
forming a geared cable having a core composed of a plurality of metal wires and a gear teeth fabricated by winding a metal wire spirally with equal intervals around a periphery of the core,
preheating the geared cable,
providing a protection coat having a concave part and convex part around a periphery of the geared cable by extrusion without vacuuming,
providing a resin coat having a concave part and convex part around a periphery of the protection coat by extrusion without vacuuming.

7. A method for manufacturing the sound proof geared cable according to claim 5 or 6, further comprising, coating silicon around a periphery of the resin coat.

8. A soundproof cable according to claim 1, wherein an outer diameter of the core is 2.5 to 2.7 mm, an outer diameter of the geared cable is 4.5 to 4.8 mm, and a thickness of the resin coat is 0.2 to 0.3 mm.

9. A sound proof geared cable according to claim 3, wherein an outer diameter of the core is 2.5 to 2.7 mm, an outer diameter of the geared cable is 4.5 to 4.8 mm, and a thickness of the resin coat is 0.2 to 0.3 mm.

10. A sound proof geared cable according to claim 9, wherein the protection coat and the resin coat are welded at the convex part of the resin coat and separated at the concave part.

* * * * *